3,753,898
DESALINATION PROCESS

Frank J. Glavis, Rydal, and David H. Clemens, Willow Grove, Pa., assignors to Rohm and Haas Company, Philadelphia, Pa.
No Drawing. Filed Mar. 16, 1971, Ser. No. 124,908
Int. Cl. C02b 1/18
U.S. Cl. 210—33                                5 Claims

---

ABSTRACT OF THE DISCLOSURE

Cross-linked polymers which preferentially sorb water from salt solutions, while excluding a substantial portion of the salt, are used to desalinate salt waters. The purified water is later thermally released from the cross-linked polymer and the polymer is used over again. Cross-linked acrylic polymers are preferred.

---

This invention relates to the use of a solid resinous composition capable of forming a hydrate thereof in aqueous solution and in its hydrated form, capable further of releasing its water of hydration to return to its initial partially hydrated or non-hydrated form. More specifically, this invention concerns a resinous composition of matter and to the process of utilizing said composition to remove water from an aqueous solution whereby the solute concentration in the solution is increased for the purpose of producing a resulting more concentrated solution and/or for the purpose of recovering desalinized water from the initial solution, said resinous composition comprising a cross-linked polyelectrolyte in bead, sheet, or other suitable form. The cross-linked polyelectrolyte preferably has certain physical and chemical characteristics which make it operative, among them being a high ionic charge (e.g., the polymer has either anionic or cationic ion exchange properties). The cross-linked polymer or polyelectrolyte should also preferably have a glass transition temperature, i.e., a Tg in the range of about 25° C. to about 65° C. in the dry state. The apparent Tg of the polymer will also become lower when it becomes wet. The polymer or polyelectrolyte will also possess a desirable degree of hydrophillicity, i.e., it will become more flexible and/or more plastic when immersed in water.

It is one object of this invention to provide a process for withdrawing water from an aqueous solution. Another object of this invention is to recover substantially pure water from a saline solution, such as sea water. Another object of the present invention is to increase the concentration of solute in a given solution to thereby reduce the amount of water to be evaporated from the solution in the recovery of a more concentrated solution or an anhydrous solute product. Still another object of the present invention is to provide a process for economically removing water from an aqueous solution on a continuously operated basis and for removing water from the solution directly without involving the large-scale consumption of utilities.

In one of its embodiments this invention relates to a process for separating water from an aqueous solution which comprises contacting said solution with a polyelectrolyte polymer or resin having characteristics of the type heretofore mentioned which is insoluble in said solution, effecting said contact at a relatively low datum temperature at which temperature said resin forms a hydrate with the water component of said solution and the solute concentration in the remaining solution is increased, removing the resulting hydrated resin from said remaining solution, separately heating said hydrated resin to a temperature above said datum temperature and removing substantially pure water or purer water from a resulting regenerated resin containing lesser water of hydration than said hydrated resin. The water will ordinarily be removed from the saline solution at a temperature in the range of from about room temperature (20° C.) to about 50° C., and then the water removed (i.e., the polyelectrolyte or resin regenerated) at a higher temperature in the range of about 40° C. to 90° C., with the proviso that the regeneration or desorption is accomplished at least about 10° C. higher than the temperature of adsorption from the solution. The removal of the purer water from the resin may be accomplished by heating the resin either alone, but preferably with the assistance of vacuum or suction. Also, as noted heretofore, the polyelectrolyte polymer or resin which has a Tg (dry) of up to about 65° C., and more preferably in the range of about 25° C. to about 65° C. it also has a Tg which is preferably intermediate between the adsorption temperature of the water from the saline solution and the release temperature of the purer water from the resin (i.e., the higher temperature at which the resin or polyelectrolyte polymer is regenerated). The specific nature of the polymer which comprises the backbone of the polyelectrolyte resin is relatively unimportant but it is essential that the resin contain at least about 10% by weight of an acid or otherwise contain at least about 10% acid functionality and, more preferably, about 25% by weight of an acid or otherwise contain at least about 25% of acid functionality. However, in general, the backbone of these insoluble resins will be the cross-linked copolymer of (1) a poly-unsaturated monomer containing a plurality of non-conjugated $CH_2=C<$ groups, which acts as a cross-linking agent and (2) a vinyl aliphatic, vinyl heterocyclic or vinyl aromatic monomer or a mixture of such monomers and another copolymerizable monovinylidene or ethylenically unsaturated comonomer.

Suitable polyunsaturated cross-linking agents include, for example, divinylbenzene, divinylpyridine, divinyltoluenes, divinylnaphthalenes, diallyl phthalate, ethylene glycol diacrylate, ethylene glycol dimethacrylate, triethylene glycol dimethacrylate and tetraethylene glycol dimethacrylate, divinylexylene, divinylethylbenzene, divinylsulfone, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylene diacrylamide, N, N'-ethylenediacrylamide, trivinylbenzene, trivinylnaphthalene, polyvinylanthracenes and the polyallyl and polyvinyl ethers of glycol glycerol, pentaterylthritol, resorcinol and the monothio or dithio derivatives of glycols.

Preferred cross-linking monomers include polyvinyl aromatic hydrocarbons, such as divinylbenzene and trivinylbenzene, glycol dimethacrylates, and polymethacrylates such as ethylene glycol dimethacrylate and triemthylolpropane trimethacrylate, and polyvinyl ethers of polyhydric alcohols, such as divinoxyethane and trivinoxypropane. The amount of cross-linking agent can be varied widely and can be as little as about ½% by weight of as much as 20% by weight but more preferably an amount of from about 1 to about 10%, on a weight basis, is usually adequate.

Suitable monoethylenically unsaturated comonomers include esters of acrylic acid, such as methyl acrylate, ethyl acrylate, propyl acrylate, isopropyl acrylate, butyl acrylate, tert-butyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxypropyl acrylate, ethoxyphenyl acrylate, ethoxybenzyl acrylate, ethoxycyclohexyl acrylate, the corresponding esters of methacrylic acid, styrene, o-, m- and p-methyl styrenes, and o-, m-, and p-ethyl styrenes, vinyl naphthalene, vinyltoluene and vinylnaphthalene. A class of monomers of particular interest consists of styrene and the esters of acrylic and methacrylic acid with a $C_1$–$C_{10}$ aliphatic alcohol. Other suitable ethylenically unsaturated monomers include hydroxyethyl methacrylate and other hydroxyl containing acrylates and methacrylates, ethylene glycol monovinyl ether, acrylamide, methacrylamide, dimethacrylamide, diacetone acrylamide, N-alkylacrylamides such as N-isopropylacrylamide, N-vinylpyrrolidone, vinyl acetate, or vinyl acetate post hydrolyzed to vinyl alcohol, allyl alcohol, and others.

The vinyl heterocyclic monomer is preferably a monovinylidene ring-containing nitrogen heterocyclic compound (monomer) or nitrogen and oxygen containing heterocyclic compound or monomer, such as a vinylpyridine or an alkyl substituted vinyl pyridine such as 2-methyl-5-vinylpyridine, 2-ethyl-5-vinylpyridine, 3-methyl-5-vinyl-pyridine, 2,3-dimethyl-5-vinylpyridine, and 2-methyl-3-ethyl-5-vinylpyridine, vinylquinoline, 2-methyl-5-vinylquinoline, 4-methyl-4-vinylquinoline, 1-methyl- or 3-methyl-5-vinylisoquinoline and vinylpyrimidine, vinylpyrazine, vinyl-s-triazine, vinylindoxazine, vinylbenzoxazole, vinylquinazoline, vinylnaphthyridine, vinylpyridine, and vinylacridine.

The acid monomer is preferably acrylic acid or methacrylic acid, but other acids such as maleic, itaconic and maleamic acids will also work.

A preferred class of polyelectrolytes comprise the cross-linked copolymers of a lower alkyl acrylate, e.g., ethyl acrylate or methyl acrylate, and/or a $C_1$ to $C_{18}$ alkyl methacrylate, e.g. methyl methacrylate or dodecyl methacrylate, an unsaturated acid such as acrylic acid or methacrylic acid and a polyfunctional aliphatic cross-linker such as trimethylolpropane trimethacrylate.

In the following examples, and throughout the specification, all parts and percentages are by weight, unless otherwise stated.

EXAMPLE 1

Preparation of bead polymer

Fifteen (15.0) grams of the bisulfate salt of poly(vinylimidazoline) are dissolved in 1065 grams of deionized water, with slight warming. After standing overnight, this solution is charged to a 3-liter, three-neck, round bottom glass flask fitted with a paddle agitator (operated by a Con-Torque stirrer), a thermometer, and a reflux condenser. To the solution is added 420 grams of NaCl and nitrogen is passed through the solution (100 cc./minute) for one hour while the stirring rate is regulated at 200 r.p.m. A nitrogen sweep is maintained throughout the polymerization. A monomer mix is prepared from 250 grams of ethyl acrylate, 240 grams of methacrylic acid, 10 grams of trimethylolpropane trimethacrylate and 5.0 grams of benzoyl peroxide. The monomer mix is added to the stirring aqueous phase, and three on-off cycles are required to achieve visually-hoomgeneous beads. Heating is started with a mantle, and the temperature is raised from room temperature to 45° C. in 46 minutes. It is maintained at 45–48° C. for 160 minutes, at which point it is raised to 65° C. Within a few minutes, an exotherm occurs so that the temperature rises to 71° C. with mild cooling. The beads, white by this time, are held at 65° C. overnight. The beads are isolated by filtration on a screen and washed with water. After air-drying, the beads have a total solids of 52%.

A portion of the beads are charged to a column, covered with deionized water, and converted to the sodium form by the slow and gradual addition of 1000 ml. of 4% NaOH solution. The converted beads are then washed with water in the column and then on a screen until the effluent is a neutral pH of 7. After air drying, these beads have a total solids of 11.8%. These beads are then ready for use in the water-removal process of the present invention.

EXAMPLE 2

Preparation of polymer in membrane form

A monomer mix is prepared from 12.5 grams of ethyl acrylate, 12.0 grams of methacrylic acid, 0.5 gram of trimethylolpropane trimethacrylate and 0.125 gram of a peroxycarbonate catalyst (Percadox 16). A three-inch circle of Baroid 987 hardened filter paper is immersed in this catalyzed monomer mix for fifteen minutes, removed and allowed to drain, and then laid between two 5 x 5 inch glass plates. This assembly is closed at the edges with Scotch tape and laid in a horizontal position 8 inches below a Hot Spot infra-red heating lamp set at half scale, so that the measured surface temperature on the glass mold is held at 53–59° C. overnight. At the end of this time, the top glass is removed under water, but the membrane remains attached to the lower glass plate. This is immersed in 0.5 N NaOH solution, at which point it releases from the glass. After half an hour in the caustic solution, the cross-linked membrane is removed and rinsed free of caustic in running water. This membrane is now ready for use in saline water. (Saline water refers to any kind of salt or brackish water and includes, for example, sea water. These waters contain a high proportion of NaCl, but obviously they contain many other kinds of ions and salts, e.g. potassium, magnesium, calcium, chlorides, bromides, etc.)

In the following runs, salt concentration in solution is determined by the standard Mohr titration with $AgNo_3$ solution to a potassium chromate end point. This gives general agreement with conductimetric measurements. In the first series of runs, no isolation of water is determined. The beads are placed in saline water at room temperature and the chloride ion concentration measured. The temperature is raised to 95° C. and another titration made. Following return to room temperature and chloride ion determination, the batch is raised to 70° C. and analyzed. This procedure is repeated at 50° C. It is clear that a change in chloride ion concentration can only result from the pick-up and release of water and the substantial exclusion of NaCl. Reversibility appears to be immediate and essentially complete. Data are listed below.

| Temperature, degrees: | NaCl, percent |
| --- | --- |
| 25 | 3.15 |
| 95 | 3.03 |
| 25 | 3.15 |
| 70 | 3.03 |
| 25 | 3.15 |
| 50 | 3.03 |
| 25 | 3.15 |

(a) In this run, 300 grams of wet beads of Example 1 are added to 300 grams of 5.4% NaCl solution prior to equilibration to the initial readings noted above.

The mixture of the above test is diluted with an additional 500 ml. of deionized water. The salt concentration is determined at room temperature, at 50° C., and at room temperature again. The data below show the same results as noted earlier.

| Temperature, degrees: | NaCl, percent |
| --- | --- |
| 25 | 2.16 |
| 50 | 2.05 |
| 25 | 2.16 |

The room temperature mix is then filtered, first under gravity and then under reduced pressure with a rubber dam sealing the top of the Büchner funnel in which the filtration is effected. Both the 920 grams of gravity filtrate and the 65 grams of vacuum filtrate analyzed for 2.21% NaCl. The receiver is then changed and steam is passed into the jacket of the Büchner funnel, a flask with 70° water in it is placed on top of the rubber dam which is in contact with the top surface of the beads, and suction is applied. The filtrate is collected in two portions and analyzed for salt content, as follows:

| Fraction | Percent NaCl | Weight, grams |
| --- | --- | --- |
| 1 | 0.3 | 21.0 |
| 2 | 0.3 | 14.5 |

The composite 35.5 grams, obtained from an initial dry polymer weight of about 36 grams, found by conductimetric analysis to have 1000–2000 p.p.m. salt.

The same beads are then replaced in the saline filtrate at room temperature for one-half hour. Again the beads are removed by filtration under suction, and again heated as described above to obtain thermal release of bound water. Again good recovery of low salt water is obtained. The filtrate contained 2.27% NaCl, and 41 grams of product water is obtained, with a NaCl content of 0.15%.

(b) Sea water is obtained from the Atlantic Ocean off Long Beach Island. It is found to have 3.05% salt content by chloride ion analysis. To 1000 grams of this sea water is added 300 grams of beads prepared according to Example 1 which had been previously immersed in 5% NaCl solution to reduce the water level in the wet beads. Again, heating the filtered beads results in the release of low-salt product in yield about equivalent to that of the weight of the dry beads employed. In all cases, it will be noted that the recovery of pure or fresh water (i.e. as purer water of low salt content) is accompanied by a slight increase in the chloride ion concentration in the sea water. Calculations show that these are mutually confirming figures.

The sea water started at 2.73% NaCl and, after removal of the beads at room temperature, had 2.83% NaCl. Thermally-recovered water from the beads totaled 33 grams at 0.15% NaCl.

To confirm the effect on treatment of lower-salt or brackish waters, a 0.7% NaCl solution is prepared and 500 grams of this solution are treated with 150 grams of wet beads (16.0 grams of dry basis beads) prepared according to the teachings of Example 1. These are filtered under reduced pressure and the remaining beads are heated in the above-described manner to produce 30 grams of product water. As shown below, this is in the potable range. Analyses are given for chloride ion determinations and ohms derived from conductance measurements.

| Material | Percent NaCl | Ohms |
| --- | --- | --- |
| Starting | 0.74 | 158 |
| Filtrate | 0.79 | 88 |
| Product (30 g.) | 0.087 | 15,000 |

(c) To illustrate the use of the membrane form of the copolymer, a three-inch pad prepared according to the teachings of Example 2 is soaked in sea water for various periods of time at room temperature, the pad is removed and allowed to drain and wipe off gently with Kleenex, and then the pad is placed in a heated Büchner funnel as described above and the thermally-released water collected and analyzed. As shown below, on five successive repetitions, a weight of water is obtained that is equal to the weight of polymer in the membrane, and the salt concentrations is about 1000 p.p.m. The weight of dry polymer in the membrane is determined to be 1.0 gram.

| Minutes in sea water | Filtrate, percent NaCl | Product Grams | Product Percent NaCl |
| --- | --- | --- | --- |
| 0 | 2.98 | | |
| 30 | 2.98 | 1.1 | 0.60 |
| 10 | 3.15 | 1.0 | 0.06 |
| 1,000 | 3.15 | 1.4 | 0.13 |
| 10 | 3.25 | 1.1 | 0.10 |
| 10 | 3.39 | 1.1 | 0.10 |

EXAMPLE 3

(a) This example shows pick-up of water by beads and build-up of salt in filtrate.

In this series, a polymer of 50 parts of ethyl acrylate 48 parts of methacrylic acid and 2 parts of trimethylolpropane trimethacrylate, in the Na salt form is water-wet. Of these wet beads, 200 grams (18% solids, 36.0 grams dry polymer) are placed in sea water and equilibrated. The beads are removed by filtration, heated on a Büchner funnel as described above to remove water. These beads are then cycled several times, as shown in the table below, in 300 ml. of fresh sea water for each cycle which has been diluted and assayed at 23,270 p.p.m. NaCl corresponding to 6.98 grams of NaCl (assuming all salt to be NaCl). In each case, 25–29 grams of recovered water are obtained on heating the beads.

In the table below are listed the run number, the weight loss of water from the sea water by sorption into the bead, the weight of sea water in the filtrate, the NaCl content in the filtrate, and the loss of NaCl from the original sea water to the filtrate. Heating the beads in each case gave a physical recovery of 25–29 grams of purified water.

| Run number | Water sorbed by beads, g. | Filtrate, g. | NaCl, g. in filtrate | Lost NaCl, g. |
| --- | --- | --- | --- | --- |
| 1 | 45 | 265 | 6.56 | 0.46 |
| 2 | 35 | 265 | 6.82 | 0.16 |
| 3 | 30 | 270 | 6.83 | 0.15 |
| 4 | 40 | 260 | 6.72 | 0.26 |
| 5 | 40 | 260 | 6.79 | 0.19 |
| 6 | 40 | 260 | 7.01 | −0.03 |
| 7 | 45 | 255 | 6.73 | 0.25 |

Average water sorbed: 37.85 grams for each cycle,
Average salt lost: 0.206 grams,
Average salt in sorbed water: 5,440 p.p.m.

In another case, beads are soaked in NaCl solution, filtered, and heated to recover water. Of these beads, 42.5 grams are soaked in 1,000 grams of salt water with 27,500 p.p.m. NaCl. On removing 38.5 grams of beads by filtration, a pick-up of 26 grams, 972 grams of filtrate is obtained, with a NaCl content of 28,100 p.p.m.

The term "Tg" (i.e. the second order transition temperature or glass transition temperature as used herein and in the claims is intended to mean and connote the phenomena and conditions normally applied by the art to said term, as, for example set forth in "Properties and Structure of Polymers," Tobolsky, John Wiley and Sons, New York, N.Y., 1960, pages 61–81. Ordinarily, a reasonably accurate estimate of the Tg of a polymer can be calculated in known manner from the published or known values of its components, excluding the effect of the cross-linker which ordinarily does not appreciably change the Tg of the polymer. Thus, with reference to the beads of Example 1, the Tg (dry) is the range of about 46° C. to 48° C. using a value of about −24° C. for the ethyl acrylate component, and a value of about 165° C. to 185° C. for the methacrylic acid component. (The Tg is calculated by converting to degrees Kelvin and then back again to ° C.). The Tg can also be measured physically by thermomechanical analysis in accordance with known techniques.

With further reference to the polymers used in the present invention, it is noted that the Tg of the polymer when wet is about 10° C. less than when dry and that the hydrophilicity or moisture holding capacity increases with lower Tg's. Thus, considering a copolymer of about 50 parts of ethyl acrylate 48 parts of methacrylic acid and 2 parts of trimethylolpropane trimethacrylate, the calculated Tg (dry) is about 47° C. and the water or moisture holding capacity is about 85.0%, whereas in the case of a copolymer of 50 parts of ethyl acrylate, 48 parts of acrylic acid and 2 parts of trimethylolpropane trimethacrylate, the calculated Tg (dry) is about 35° C. and the water-holding capacity is about 94.4%.

While the examples and disclosure hereinabove describe thermal release of the pure or purer water, it is to be understood that this release may be assisted and recovery and/or removal of purer water effected, either simultaneously with the thermal release or subsequently, with the aid of physical means, such as vacuum, pressure, physical wiping, suction, etc. Also, while the examples show the use of the polymer in bead or membrane form, it can also be used, for example, in a sheet or continuous sheet form, etc. Other forms will occur to those skilled in the art.

Although not shown in the example above, the polymers used in this invention are also useful in non-saline solutions. Thus, for example, beads prepared according to Example 1 above have been placed in brewed coffee, containing originally about 0.9% total solids which is dark brown in color, and allowed to stand for about a half hour. The filtrate is then removed at room temperature and found to contain 1.2% total solids. Thereafter, thermally released water which is water-white and clear, with a total solids content of 0.0%, is obtained from the beads.

We claim:

1. A process for separating water from a saline water which comprises contacting said saline water with a polyelectrolyte insoluble in acid solution, said polyelectrolyte comprising a cross-linked polymer having ion exchange properties and acid functionality and said polymer having a Tg in the dry state of at least about 25° C. and up to about 65° C., effecting said contact at a relatively low datum temperature at which temperature said polymer preferentially sorbs water from the saline water and forms a hydrate therewith and the solute concentration in the remaining saline water is increased, removing the resulting hydrated polymer from said remaining saline water, separately heating said hydrated polymer to a temperature at least about 10° C. above said datum temperature and removing purer water from the polyelectrolyte, said polymer being a cross-linked polymer of about 50 parts by weight of ethyl acrylate, about 48 parts by weight of methacrylic acid, and about 2 parts by weight of trimethylolpropane trimethacrylate, the polymer being used in the sodium salt form.

2. Process according to claim 1 in which the Tg of the polymer is higher than the initial water adsorption temperature but lower than the temperature at which the purer water is removed from the resin.

3. Process according to claim 2 wherein the polymer is used in bead or membrane form.

4. Process according to claim 1 wherein the saline water is sea water.

5. Process according to claim 1 wherein the saline water is a brackish water.

References Cited
UNITED STATES PATENTS

| | | | |
|---|---|---|---|
| 3,234,125 | 2/1966 | Bloch | 210—59 |
| 3,438,893 | 4/1969 | Anderson et al. | 210—59 |
| 3,441,501 | 4/1969 | Segall et al. | 210—59 X |
| 3,234,126 | 2/1966 | Bloch | 210—59 |

SAMIH N. ZAHARNA, Primary Examiner

T. G. WYSE, Assistant Examiner

U.S. Cl. X.R.

210—59